United States Patent [19]

La Porte, Jr.

[11] 4,057,136
[45] Nov. 8, 1977

[54] GRAVITY FOR SOLID PARTICULATE MATTER

[76] Inventor: Arthur E. La Porte, Jr., 62 Thurlow Ave., Rochester, N.Y. 14609

[21] Appl. No.: 713,801

[22] Filed: Aug. 12, 1976

[51] Int. Cl.$^2$ .......................... A01K 5/00; B65G 11/20
[52] U.S. Cl. ....................................... 193/3; 119/52 R; 141/102; 141/283; 141/286; 239/650
[58] Field of Search .................. 193/3, 29; 119/52 R, 119/52 AF, 82; 141/102, 283, 286; 198/569; 239/650; 214/17 C, 17 CB

[56] References Cited

U.S. PATENT DOCUMENTS

| | | | |
|---|---|---|---|
| 134,293 | 12/1872 | Kneisly | 193/3 |
| 260,764 | 7/1882 | Marks | 193/3 |
| 1,068,006 | 7/1913 | Pottinger | 193/3 |
| 1,768,247 | 6/1930 | Gardner | 193/3 |
| 2,055,075 | 9/1936 | Gardner | 141/286 |
| 2,677,550 | 5/1954 | Berger et al. | 239/650 |
| 2,709,987 | 6/1955 | Bubenzer | 119/52 AF |
| 3,868,028 | 2/1975 | Mausser | 214/17 C |

FOREIGN PATENT DOCUMENTS

| | | | |
|---|---|---|---|
| 37,727 | 6/1909 | Germany | 193/3 |
| 19,864 | 12/1889 | United Kingdom | 214/17 C |

*Primary Examiner*—Evon C. Blunk
*Assistant Examiner*—Jeffrey V. Nase
*Attorney, Agent, or Firm*—Charles S. McGuire

[57] ABSTRACT

A structure for receiving a supply of particulate solids such as grain, silage, haylage, or the like, at the top and dividing it into substantially equal portions as the feed falls by gravity to the bottom of the structure. A system of baffles and dividers directs the material and splits it into increasingly smaller, individual portions as it slides down the inclined surfaces of the structure.

6 Claims, 14 Drawing Figures

U.S. Patent  Nov. 8, 1977  Sheet 1 of 3  4,057,136
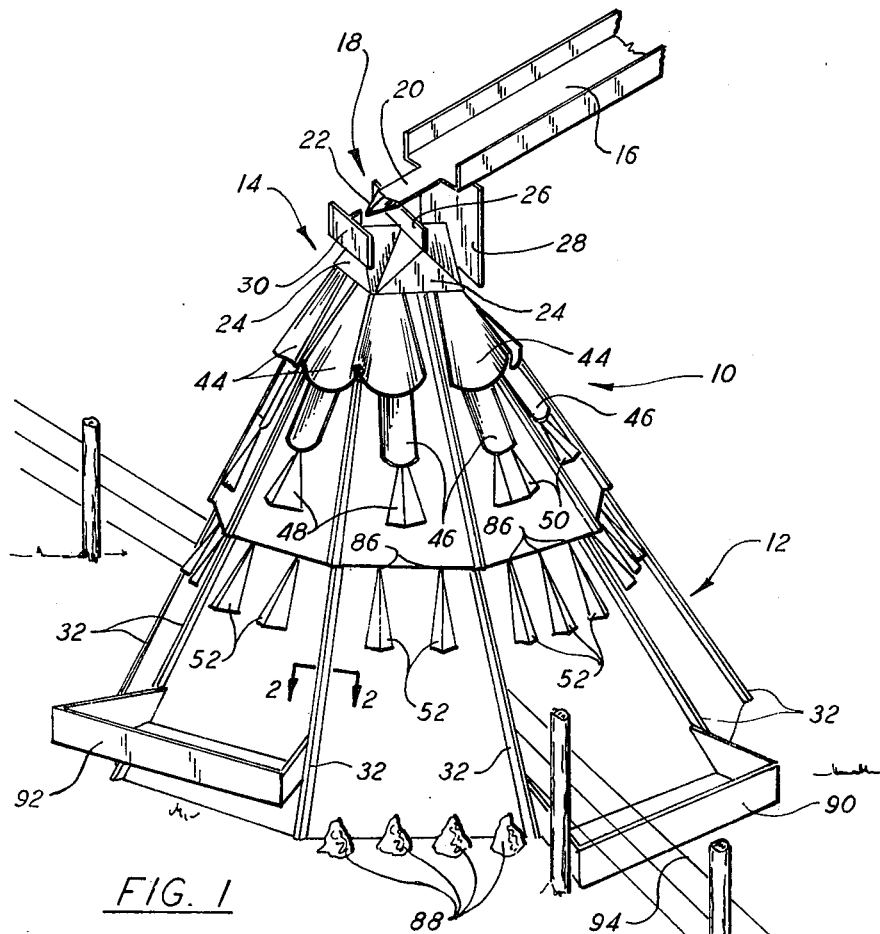
FIG. 1
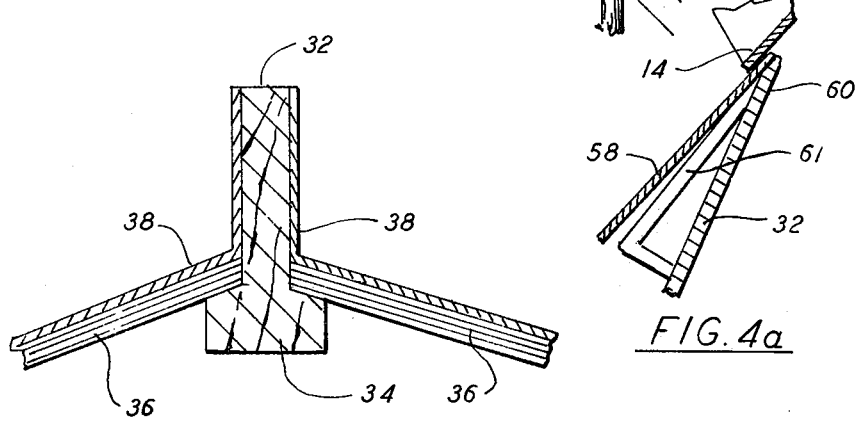
FIG. 2
FIG. 4a

GRAVITY FOR SOLID PARTICULATE MATTER

FIELD AND OBJECTS OF THE INVENTION

The present invention relates to distributors for solid material in the form of discrete particles and, more particularly, to a structure for dividing a supply of particulate matter into approximately equal or other relatively sized portions as it falls by gravity.

A principal object of the invention is to provide a simple and economical structure capable of dividing a continuous supply of granular, or other particulate, solid material into separate, approximately equal portions.

A further object is to provide structure to which animal feed is supplied at the top and divided into portions of predetermined relative size as it falls by gravity down the walls of the structure.

Another object is to provide novel, combined structure for positioning a plurality of bags to be filled with solid, particulate material and for dividing such material into substantially equal portions as it is delivered by gravity to the bags.

Other objects will in part be obvious and will in part appear hereinafter.

SUMMARY OF THE INVENTION

The divider or distributor structure is essentially pyramidal in form having a total of eight side walls in the disclosed embodiments. A supply of feed is delivered by an inclined chute to the top of the structure which has a configuration adapted to split the material into equal portions as it falls over the outwardly sloped surfaces. Each of the portions is equally divided as the feed falls from the top structure into chutes, each positioned at the upper end of one of the sides of the structure. Also associated with each of the sides, at a position below the discharge ends of the chutes, is a divider having a top portion directed at the center of the chute and a wider base. Thus, the portions of feed delivered from the chutes are divided into further equal portions by the dividers. Additional dividers may be provided at lower positions on the surface of the structure for dividing the portions of material from the first dividers into additional equal parts.

The structure is considered to have principal utility in the field of animal feed distribution. Feeds such as grain, sileage, haylage, or other materials in the form of discrete, solid particles delivered via an inclined chute are divided into substantially equal portions. In a first disclosed embodiment, the feed is divided into 32 portions in a location where the distributed material fed to the animals. In a second embodiment, the feed or other material is divided into 24 equal portions which are deposited in bags positioned around the base of the divider structure. The bags are supported on a platform which is movable about the divider structure as the bags are filled in three steps, one-third of the total material to be placed in each bag being distributed in each step.

BRIEF DESCRIPTION OF THE DRAWINGS

FIG. 1 is a perspective view of structure embodying the invention;

FIG. 2 is an enlarged, fragmentary plan view in section on the line 2—2 of FIG. 1;

FIG. 4a is a fragmentary, sectional view taken on the line 4a—4a of FIG. 4; and

DETAILED DESCRIPTION

Figure 8:
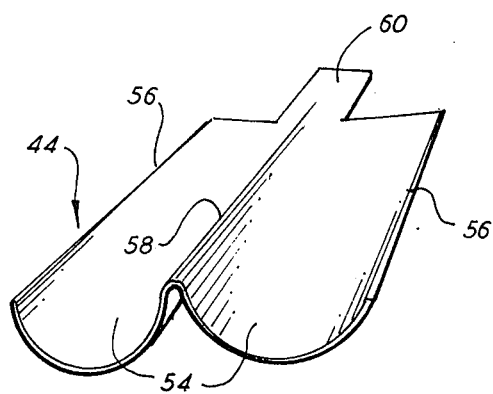
FIGS. 8–11 are perspective views of various individual elements of the structure of FIG. 1.

The distributor structure shown in FIG. 1 is in the form of an octagonal pyramid constructed in upper and lower sections generally designated by reference numerals 10 and 12, respectively, having top portion 14 mounted on upper section 10. Although it is essential that the structure slope outwardly from an essentially pointed top, the number of sides if not critical. That is, the structure may be one-sided (conical) or be divided on its external surface into any practical number of sides. In any case, the material is delivered to the top of the structure and deposited thereon to fall freely over the outwardly sloping surfaces.

The structure is especially useful in distributing animal feeds into substnatially equal portions, and is so indicated in FIG. 1. Although not strictly limited to employment in this application, the ensuing description will refer to the material being divided is animal feed. The feed may be in any common form of particulate solids, such as grain, silage, haylage, finely ground or powered solids, pellets, etc. Chute 16 extends from some point at which the feed is deposited thereon to a discharge end 18 having a first portion 20, somewhat narrower than the major portion of the chute, and a tapered portion 22.

Top section 14 is formed in the manner of four gables having upper edges in the same plane. The triangular ends of two of the gables are seen in FIG. 1, both numbered 24. Chute 16 is arranged with its central axis superposed with the upper edge of two of the gables. A planar dividing baffle 26 extends vertically from the upper edge of the gables transverse to the chute axis to the lower side of the chute discharge end 18 at the juncture of portions 20 and 22. End baffles 28 and 30 extend vertically upward from the ends of the two gables transverse to the chute axis to prevent feed from spilling off the ends of top section 14.

The major portion of the structure is formed in upper and lower sections 10 and 12 for convenience of transport and handling prior to final installation, although it will be understood that the structure may be fabricated in a single section. The sections are formed by attaching planar sheets to longitudinal struts. As shown in FIG. 2, the struts are cut at 22½° angles on each side to provide rib 32 separating the external surfaces of adjacent sides, which meet at 135°, and internal portion 34. Plywood sheets 36 are nailed to the angularly cut faces of internal portion 34 and sheet metal coverings 38 are fastened to sheets 36 and to the sides of rib 32. The struts are identically formed in the upper and lower sections and the lower ends of the upper section struts rest on the upper ends of the lower section struts when the two sections are assembled as shown. Preferably, at least the sheet metal coverings of each side portion overlap at the point where the two sections meet by extending the upper section covering lower than the ends of the respective struts. It will also be understood that constructions utilizing other materials, including concrete cast in sites, are contemplated.

Figure 3:
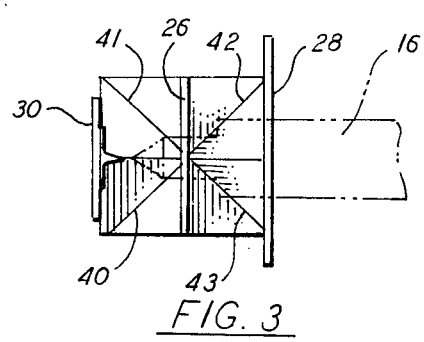
FIG. 3 is a plan view of the top section of the structure of FIG. 1.

In FIG. 3 top section 14 is seen in plan view with chute 16 extending thereover. Lines 40, 41, 42 and 43 indicate the junctures of the four gables, that is, the lines or "valleys" along which two surfaces of adjacent gables meet. The configuration and position of chute 16, and particularly of end portion 18 thereof, is such that half of the feed delivered by gravity down the chute falls on one side of central baffle 26 and the other half falls on the opposite side. Also, the feed is evenly distributed on each side of the central axis of the chute. Thus, one-quarter of the feed is deposited between each pair of gables and slides down the surfaces meeting at each of lines 40, 41, 42, and 43.

Affixed to upper section 18 with their upper ends extending under the lowermost edges of top portion 14 are four double-sided chutes, portions of three of which may be seen in FIG. 1, all designated by reference numeral 44. Downwardly disposed on upper section 10 from each of the two sides of all four of chutes 44 are eight individual chutes 46, five of which are seen in FIG. 1. Also affixed to the outer surfaces of upper section 10, with upper ends positioned at the lower edge of chutes 46 are dividers 48 and 50, the two reference numerals being used to denote two different configurations of the dividers. Further dividers 52 are affixed to the outer surfaces of lower section 12 of the distributor structure.

Figure 4:
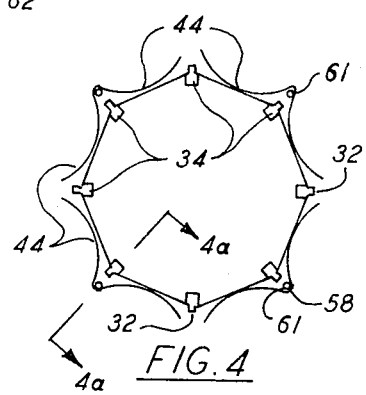
FIGS. 4–7 are plan views of representative cross sectional planes of the structure of FIG. 1.
Figure 5:
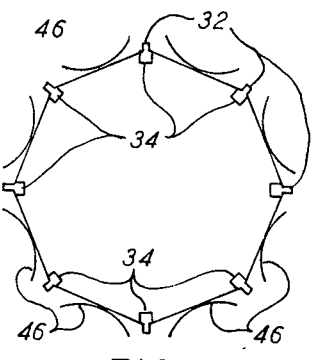

Chutes 44 are shown in greater detail in FIG. 8, and their association with upper section 10 is shown in the sectional plan view of FIG. 4. Each of chutes 44 is identically formed with a pair of concave surfaces 54 having outer edges 56 and separated by central ridge 58. Tab 60 is provided on the upper end for insertion under a lower edge of top section 14, with central ridge 58 positioned in line with one of lines 40, 41, 42, and 43, and with one of ribs 32. The height of ridge 58 increases toward the discharge ends of chutes 44. Thus, as the feed slides downwardly off top section 14, substantially one-quarter of the total amount supplied from chute 16 is received at the upper end of each of the four double-sided chutes 44 and equally divided at center ridges 58 thereof so that one-eighth of the total slides down each of surfaces 54. An L-shaped support 61, such as a bent metal pipe or tubing, is provided under central ridges 58 of each of chutes 44, as seen in FIG. 4a.

Figure 9:
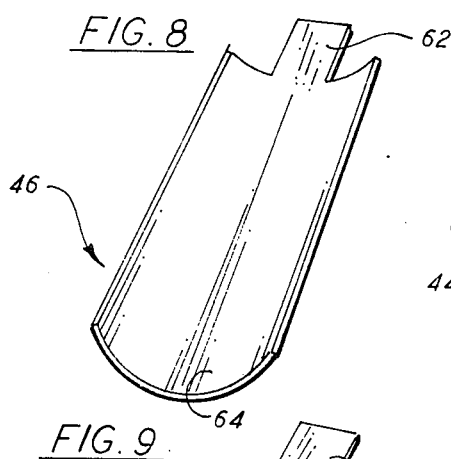

Chute 46, as seen in FIG. 9, is formed with upper tab 62 for insertion under the center of the lower edge of one of concave surfaces 54. A total of eight chutes 46 are provided, each arranged to receive at its upper portion, adjacent tab 62, the feed discharged from one of concave surfaces 54 of doublesided chutes 44. The feed slides by gravity down chute 46, and will thus remain substantially symmetrical, i.e., an equal amount of feed will be on each side of the chute centerline as it is discharged from lower edge 64.

Figure 10:
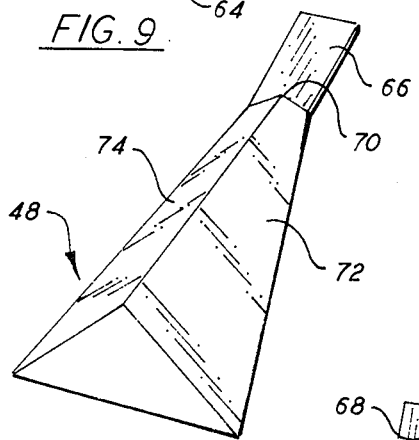
Figure 6:
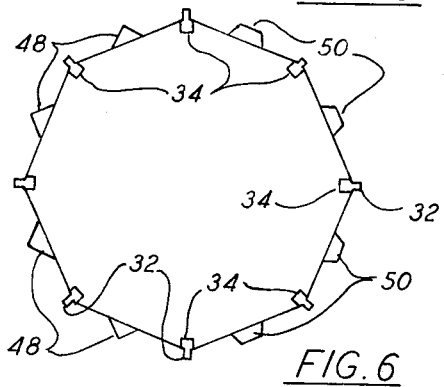
Figure 11:
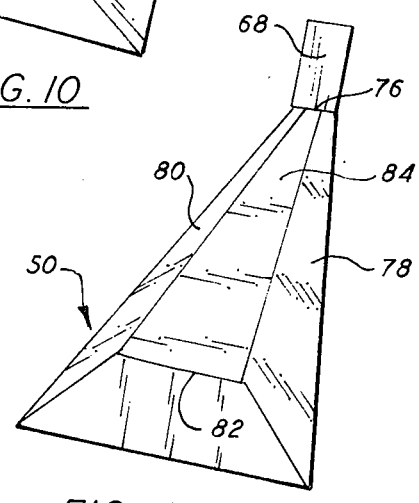
Figure 7:
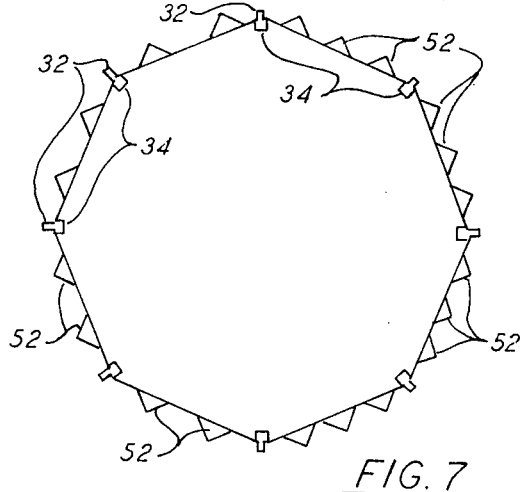

Positioned with its upper end directly adjacent edge 64 of chute 46 is a divider element which may take either the form shown in FIG. 10 and designated by reference numeral 48, or that shown in FIG. 11 and numbered 50. Divider 48 is provided with tab 66 for insertion under edge 64 of chute 46 so that no feed discharge from the chute passes under the divider. Tab 68 is likewise provided on divider 50. The upper end of divider 48 comes to a point 70 which is positioned closely adjacent edge 64 at the centerline of chute 46. From point 70, divider 48 diverges downwardly and increases in height (i.e., in displacement from the outer surface of upper section 10) at its centerline, forming sides 72 and 74.

Divider 50 has upper edge 76 disposed closely adjacent a lower edge 64 of one of chutes 46. Sides 78 and 80 diverge downwardly from upper edge 76 and the height of divider 50 increases from upper edge 76 to lower edge 82. Surface 84 is of constant width and extends from the upper to the lower edges of divider 50 between sides 78 and 80.

Referring again to FIG. 1, dividers 52 are of essentially the same configuration as dividers 48, although somewhat narrower at the lower edges. Tabs such as those previously described may be provided on dividers 52 for insertion under the lower edge of upper section 10 where it meets lower section 12 to which dividers 52 are attached. The pointed upper ends 86 of dividers 52 are positioned so that the streams of feed emerging from each side of dividers 48 and continuing down the outer surface of upper section 10 will be bisected thereby. In the case of dividers 50, the feed emerges in three substantially equal streams, one from each of diverging sides 78 and 80, and one from lower edge 82 of surface 84. Three of dividers 52 are positioned on lower section 12 below dividers 50 to split each of the three streams of feed emerging therefrom into two equal portions.

Thus, it may be seen that a quantity of feed delivered down chute 16 will be positioned with 50% on each side of baffle 25; 25% of the total will slide down each of the four intersections of the gabled top section 14. Central ridge 58 splits in half each of the four streams of feed discharged from the top section so that one-eighth of the total feed is carried by each of the eight concave surfaces 54 of double-sided chutes 44. Each stream representing one-eighth of the total feed is directed from chutes 44 by chutes 46 to the upper ends of dividers 48 or 50. The streams are split in half by dividers 48, thereby resulting in streams representing one-sixteenth of the total feed, and into thirds by divider 50, thereby dividing each eighth stream by one-third, or into streams representing one twenty-fourth of the total. Each of the streams from dividers 48 and 50 is again split in half by dividers 52, whereby the feed finally deposited at the base of the structure is divided into portions representing one thirty-second of the total amount of feed originally delivered down chute 16 in the case of feed passing over dividers 48, and into portions representing one forty-eighth of the total in the case of feed passing one dividers 50.

The use of dividers which split the feed into different fractions on the same distributing structure is useful where the same type of feed is used for both large and small animals. For example, four sides of the structure may be equipped with dividers 48 so that a total of 16 equal, individual portions are provided at the bottom of the structure, such as the four indicated by reference numeral 88 on one side of the structure. A total of 24 portions will be provided on the four sides of the structure on which dividers 50 are attached. Rather than depositing the portions of feed on the ground, mangers may be provided at ground level or elevated positions, as indicated by reference 90 and 92, respectively. Fence 94 may be attached at opposite sides of the structure, or in other desired positions, to separate the areas in which different sized portions of feed are provided.

Figure 12:
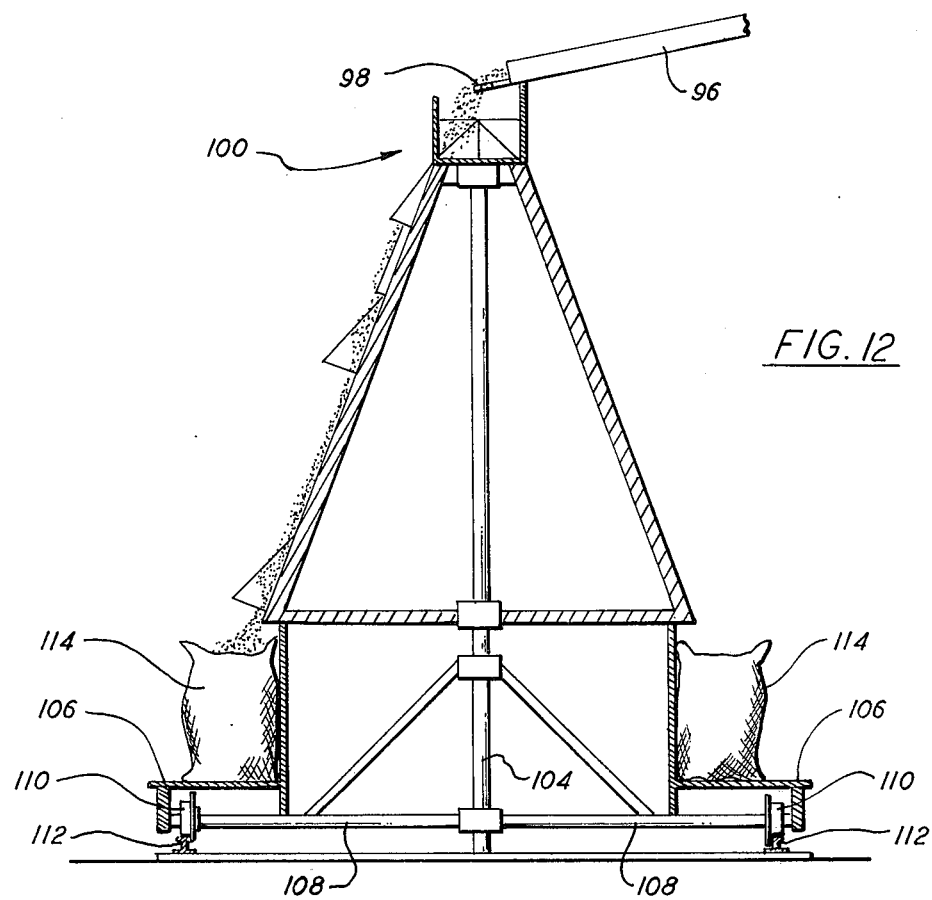
FIG. 12 is a side elevational view, in vertical section through the center, of another embodiment of the invention.
Figure 13:
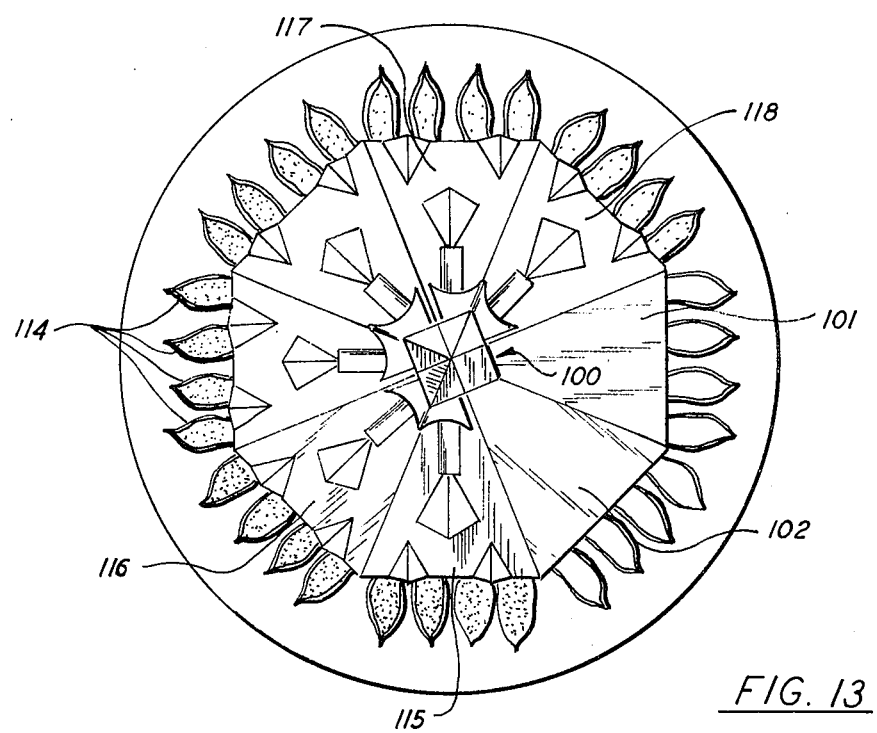
FIG. 13 is a top plan view of the embodiment of FIG. 12.

In the embodiment of FIGS. 12 and 13, the distributor is adapted to fill bags with the particulate matter which is divided as it falls by gravity down the sides of the structure. The dividing structure is again in the form of an eight-sided pyramid, the particulate matter being delivered to the top by inclined chute 96 in the same manner as the previously described embodiment. In this case, however, end portion 98 of chute 96 is formed to discharge the material to top section 100, which is formed the same as top section 14, in three equal portions instead of four. That is, rather than depositing equal portions of the material between each of the four gables of the top section, end portion 98 is appropriately configured to provide material between only three gables. Material delivered by chute 96 is therefore split by top section 100 into three, rather than four, equal portions. No material passes down the sides indicated by reference numerals 101 and 102; accordingly, no divider members are provided on these sides.

The divider structure is supported at its center upon post 104. Platform 106 is likewise supported by post 104 and other appropriate support members 108 below the lowermost edge of the divider structure. Rollers 110 are mounted on the ends of support members 108 and rest upon circular track 112. Thus, platform 106 is rotatably movable about the base of the stationary divider structure, post 104 being rotatably journaled in the base of the divider structure.

Bags 114 are filled with the feed or other particulate solids which slide down six sides of the divider structure. Platform 106, being rotated by any suitable drive means, is indexed one-quarter revolution between each filling step. While the platform is stationary, eight empty bags are positioned thereon with the tops held open by appropriate structure (not shown) adjacent the lower edge of sides 101 and 102 of the divider structure after removing full bags from the same portion of the platform. At the same time, a quantity of solid matter sufficient to fill eight bags (i.e., to fill each of 24 bags to one-third of their final content) is delivered through chute 96. One-third of the total amount of solids passes down the two sides indicated by reference numerals 115 and 116 and is divided into eight equal portions by the same type of divider members on the outer surfaces as described in connection with the preceding embodiment.

After the solids have been deposited in the bags, platform 106 is rotated one-quarter revolution and stopped. Another quantity of solids sufficient to fill eight bags is delivered through chute 96 as the platform remains stationary. Thus, the bags are filled in three stages, the final third of the solid matter being deposited therein as the bags are adjacent sides 117 and 118 of the divider structure. As previously noted, full bags are removed from and a new supply of empty bags positioned on the platform adjacent sides 101 and 102 as the filling continues on the other six sides. If desired, the platform may remain stationary and the divider structure rotated between each filling stage, in which case divider members would be provided on all eight sides.

The bags may be filled with any desired quantity of material, of course, in three equal filling steps. That is, when the initially empty bags are adjacent sides 115 and 116 they will be filled to one-third of their final capacity. At the same time, the bags at the next station are filled to two-thirds of their capacity and the bags adjacent sides 117 and 118 are completely filled. The material is measured as it is delivered to chute 96. After the filled bags are removed from platform 106 they are weighed and any necessary adjustments due to slight irregularities in distribution are made by adding or removing material before the bags are closed.

What is claimed is:

1. A structure for distributing a supply of solid, particulate material into a plurality of discrete portions of predetermined relative size, said structure comprising:
   a. an inclined chute having a discharge end adapted to deliver a supply of feed by gravity;
   b. an upper distributing section having four gables with upper edges disposed in a common horizontal plane, all meeting at a single point, and a plurality of discrete surfaces sloping outwardly and downwardly from said single point, the latter being located below said discharge end and in such lateral relation thereto that a supply of particulate material delivered by gravity from said discharge end falls substantially symmetrically about said point and down each of said discrete surfaces; and
   c. a lower distributing section having at least one external surface disposed below and sloping outwardly and downwardly from said upper distributing section, and a plurality of divider elements extending outwardly from said external surface at selected locations thereon, each of said elements having side surfaces diverging away from one another and from the plane of said external surface from an uppermost point substantially in said plane, whereby material sliding down said external surface is divided by said elements into a plurality of discrete portions of predetermined relative proportion.

2. The invention according to claim 1 and further including a central vertical baffle extending upwardly from one of said upper edges.

3. The invention according to claim 1 wherein at least some of said divider elements are arranged at different vertical levels on said external surface than others and in such lateral relation thereto that the elements at the lower level receive substantially symmetrically at said uppermost point thereof material sliding from one of said side surfaces of an element at the higher level.

4. The invention according to claim 1 wherein said discharge end is so constructed and arranged that a continuous supply of particulate matter falls therefrom in a plurality of substantially equal streams.

5. The invention according to claim 4 and further including platform means disposed symmetrically about and below the lowermost edge of said distributing section and relatively movable with respect thereto.

6. The invention according to claim 5 wherein said platform means is movable about a vertical axis through the center of said distributing section.

* * * * *